United States Patent [19]
Phifer

[11] Patent Number: 5,823,025
[45] Date of Patent: Oct. 20, 1998

[54] LOCK SYSTEM WITH A LOCK-OUT SAFETY DEVICE FOR WHEELED VEHICLES

[76] Inventor: Sherwood Phifer, 2120 E. Tremont Ave., Bronx, N.Y. 10462

[21] Appl. No.: 640,117

[22] Filed: Apr. 30, 1996

Related U.S. Application Data

[63] Continuation of Ser. No. 160,073, Nov. 3, 1993, abandoned, which is a continuation-in-part of Ser. No. 746,118, Aug. 15, 1991, Pat. No. 5,265,451.

[51] Int. Cl.$^6$ .................................................. B60R 25/00
[52] U.S. Cl. .............................. 70/226; 70/38 R; 70/233; 70/427
[58] Field of Search ...................... 70/25, 32–34, 70/38 A, 38 R, 49, 52–56, 225–228, 233, 236, 389, 416, 420, 423, 424, 427, 428; 188/31, 69; 280/288.4

[56] References Cited

U.S. PATENT DOCUMENTS

| 2,104,981 | 1/1938 | Falk | 70/38 R |
|---|---|---|---|
| 2,656,704 | 10/1953 | Mancuso | 70/33 |
| 4,697,444 | 10/1987 | Maffey | 70/389 X |
| 5,265,451 | 11/1993 | Phifer | 70/233 X |
| 5,365,758 | 11/1994 | Shieh | 70/233 X |

FOREIGN PATENT DOCUMENTS

| 086381 | 8/1983 | European Pat. Off. . |
|---|---|---|
| 528285 | 11/1921 | France . |
| 3623231 | 1/1988 | Germany . |
| 9006312 | 10/1990 | Germany . |
| 2045332 | 10/1980 | United Kingdom . |

*Primary Examiner*—Suzanne Dino
*Attorney, Agent, or Firm*—Weil, Gotshal & Manges LLP

[57] ABSTRACT

A lock for a motorcycle has a generally U-shaped construction. The open end of the U is slipped over the brake rotor of the front wheel or the sprocket of the rear wheel of the motorcycle. A bolt then extends across the open end of the U-12 shape to hold the device in place. This bolt is engaged by a spring loaded pin so as to hold it in position. Rotation of the wheels is then prevented by contact between the lock and the brake calipers on the front wheel or the chain or sprocket on the rear wheel. In order to release the bolt, a cam and a spring biasing the pin in the opposite direction are provided so that rotation of the cam allows the pin to be withdrawn from the bolt. The lock includes a lock-out mechanism which prevents the motorcycle from being started when the lock is in place because the lock-out mechanism retains the ignition key. In addition to the lock, a single loop cable can be provided for attachment about a stationary object and received within a channel in the lock. This channel in the lock also has a spring loaded pin which engages the head of the cable under the influence of the cam.

23 Claims, 9 Drawing Sheets

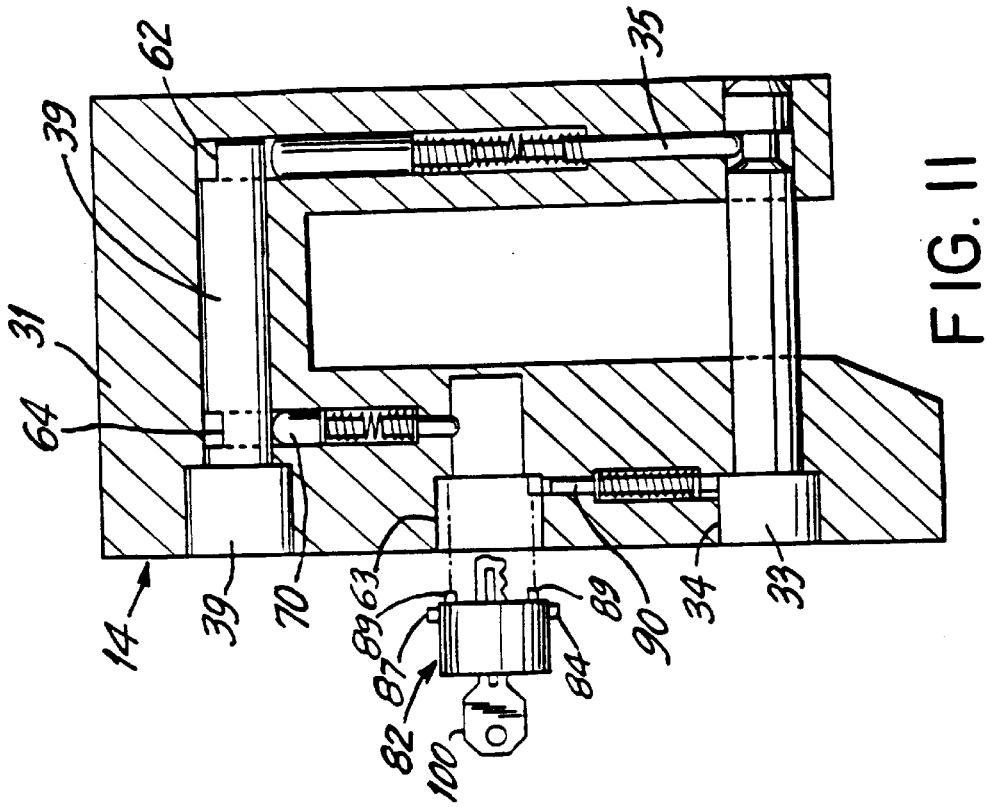
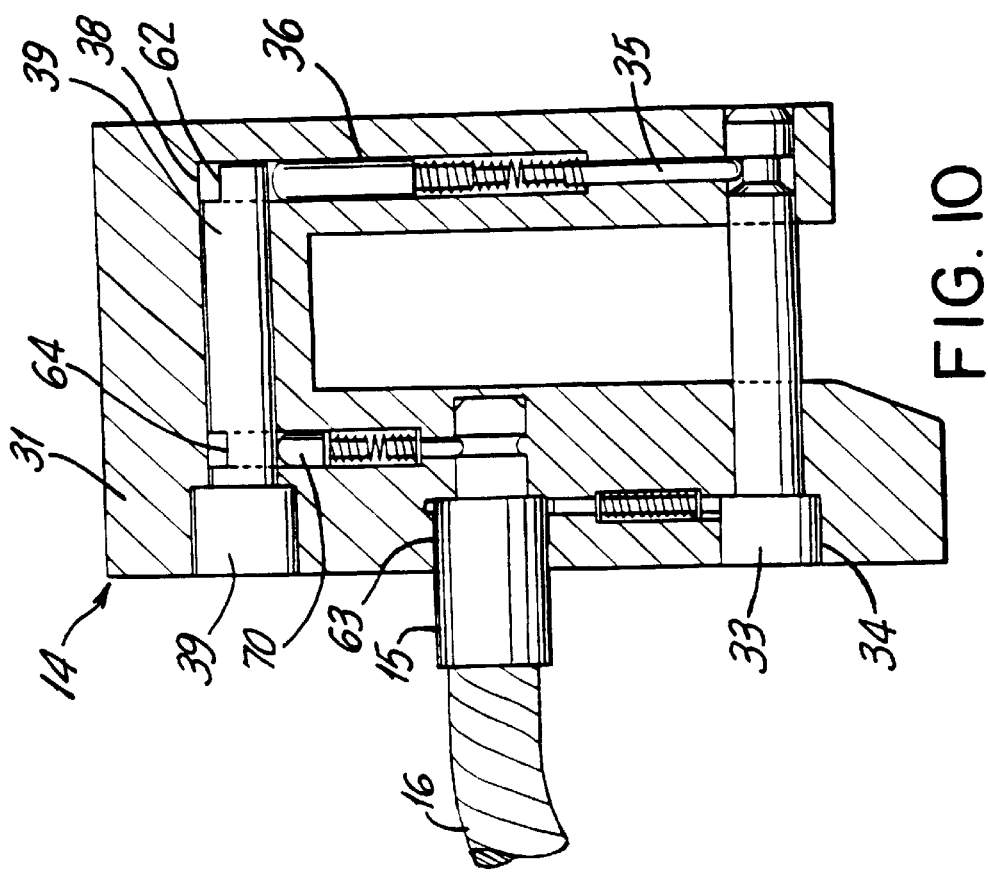

& # x20;# LOCK SYSTEM WITH A LOCK-OUT SAFETY DEVICE FOR WHEELED VEHICLES

This is a continuation of application Ser. No. 08/160,073 filed on Nov. 30, 1993 and now abandoned, which is a cip of Ser. No. 07/746,118, now U.S. Pat. No. 5,265,451.

BACKGROUND OF THE INVENTION

This invention relates to vehicle locks and, more particularly, to motorcycle locks.

In recent years, the cost of motorcycles has escalated substantially. In many instances, a motorcycle can cost as much as an automobile. Therefore it is important to provide means for reducing the potential for theft of such a vehicle With automobiles the starting and steering mechanisms are within the interior of the vehicle so that some security can be provided by locks on the doors of the vehicle. However, with a motorcycle, the starter and steering wheel, and indeed the entire engine, is exposed so that it can be tampered with by potential thieves.

The most typical way of protecting a motorcycle against theft is by means of a large chain, which can be looped through one of the wheels and/or a portion of the frame and then extended about a stationary object, such as a tree or lamp post. In order to provide this capability the chain has to be relatively long, in the neighborhood of 4 to 6 feet. Thus, it is very cumbersome to store. In addition, the links of the chain are readily exposed so that a thief with the proper equipment can cut through the links of the chain at a critical point and remove it from the motorcycle.

Another type of motorcycle lock which is sold under the trade name KRYPTONITE is in the form of a large U-shaped piece Another type of motorcycle lock which is sold under the trade name KRYPTONITE is in the form of a large U-shaped piece which has a straight cylinder extending across the open end of the U-shape. Typical Kryptonite locks are about a foot and a half in length and are thus also very difficult to store. The U-shaped portion of the lock also extends through a wheel of the vehicle or motorcycle. It essentially prevents theft because the lock prevents complete rotation of the wheel in that it comes against the portion of the fork holding the wheel onto the motorcycle. However, kryptonite-type locks can also be removed with metal cutting tools.

It would be advantageous to have a motorcycle lock which is relatively small in size, for example so that it can be carried in a person's coat pocket, and that is difficult to is remove even with metal cutting tools.

SUMMARY OF THE INVENTION

The present invention is directed to a motorcycle lock which is relatively small in size and is difficult to tamper with. This lock is created by means of a device which fastens onto the brake rotor of the motorcycle and has a sufficient thickness so that it cannot pass between the calipers of the motorcycle brake on that wheel or the wheel fork.

In an illustrative embodiment of the invention, the lock is in the form of a generally U-shaped device of approximately 6 inches in length and 2½ inches in width. The gap between the legs of the U-shape is only wide enough to allow it to slide over the motorcycle brake rotor, i.e. approximately one-half inch.

When the lock is slipped over the brake rotor, it extends from the outer edge of the rotor to one of the plurality of apertures at its inner edge. A locking bolt then extends across and closes the end of the gap between the legs of the U-shape. This bolt is held in the locking position by means of a spring loaded locking pin that is received in a recess at the end of the bolt. The locking pin is in the form of two sections which are biased apart by means of an inner spring. In addition, the overall pin is spring biased out of the recess in the bolt by means of an outer spring. A rotatable cam fastened to the end of a lock cylinder has a cam face which can be turned by the key for the lock cylinder so as to compress the outer spring on the locking pin and keep it engaged in the recess of the bolt.

In a preferred embodiment of the invention, a rotatable lock-out device is included in a lock-out channel in one leg of the U-shaped device. In one position, a cam surface on the lock-out device causes an additional pin to extend into a further recess in the locking bolt channel against the bias of a lock-out spring. Thus, with the lock-out device in this position the locking bolt cannot be engaged to close the gap between legs of the U-shaped device and fasten the lock to the brake rotor. However, the lock-out device can be rotated to a second position by the ignition key of the motorcycle, as opposed to the lock key. This moves the cam surface so the lock-out spring can bias the lock-out pin from the bolt channel so the locking bolt can slide across the gap and fasten the lock to the brake rotor.

Once in the second position the lock-out device can be removed from the lock-out channel. However, the lock-out device clamps onto the motorcycle ignition key when the lock-out device is not installed in the lock. Therefore, when the user approaches the motorcycle to drive off, the lock-out device is clamped on the ignition key and prevents the user from starting the motorcycle. This is an added safety feature since it can be extremely dangerous to start and drive off on the motorcycle with the lock engaged.

To start the motorcycle the user must first remove the lock from the rotor, then insert the combined lock-out device and ignition key into the lock-out channel of the locking device. When the key is rotated, the lock-out pin is forced into the locking bolt channel by the movement of the cam surface on the lock-out device. If a spring is provided at the end of the locking bolt, the locking bolt will automatically retract, opening the gap between the legs of the locking device.

In a still further embodiment of the invention, a single looped cable can be provided and attached to the locking device. The loop can be placed around some stationary item and an end of it inserted into the same channel as the lock-out device, once the lock-out device is removed. This cable end has a recess which is engaged by a cable pin that has a double acting spring. When the cable end is pushed into the channel for the lock-out device, the cable pin engages a recess in the end, thus holding it in place. When the lock key and the cam attached to it are rotated, not only does it release the locking pin bolts, it also releases the cable pin so the cable can be removed.

According to another provision of the present invention, a shield plate extends from the gap between the legs of the lock and surrounds some of the bolts on the hub. This makes it more difficult to release the front wheel during a theft attempt.

BRIEF DESCRIPTION OF THE DRAWINGS

The foregoing and other features of the present invention will be more readily apparent from the following detailed description and drawings of illustrative embodiments of the invention in which:

FIG. 10 is a front sectional view of an alternative embodiment of the lock of the present invention with a cable attached to the lock body;

FIG. 11 is the front sectional view of FIG. 10 with the cable detached and a lock-out mechanism positioned near the lock body;

DESCRIPTION OF ILLUSTRATIVE EMBODIMENTS

Figure 1:
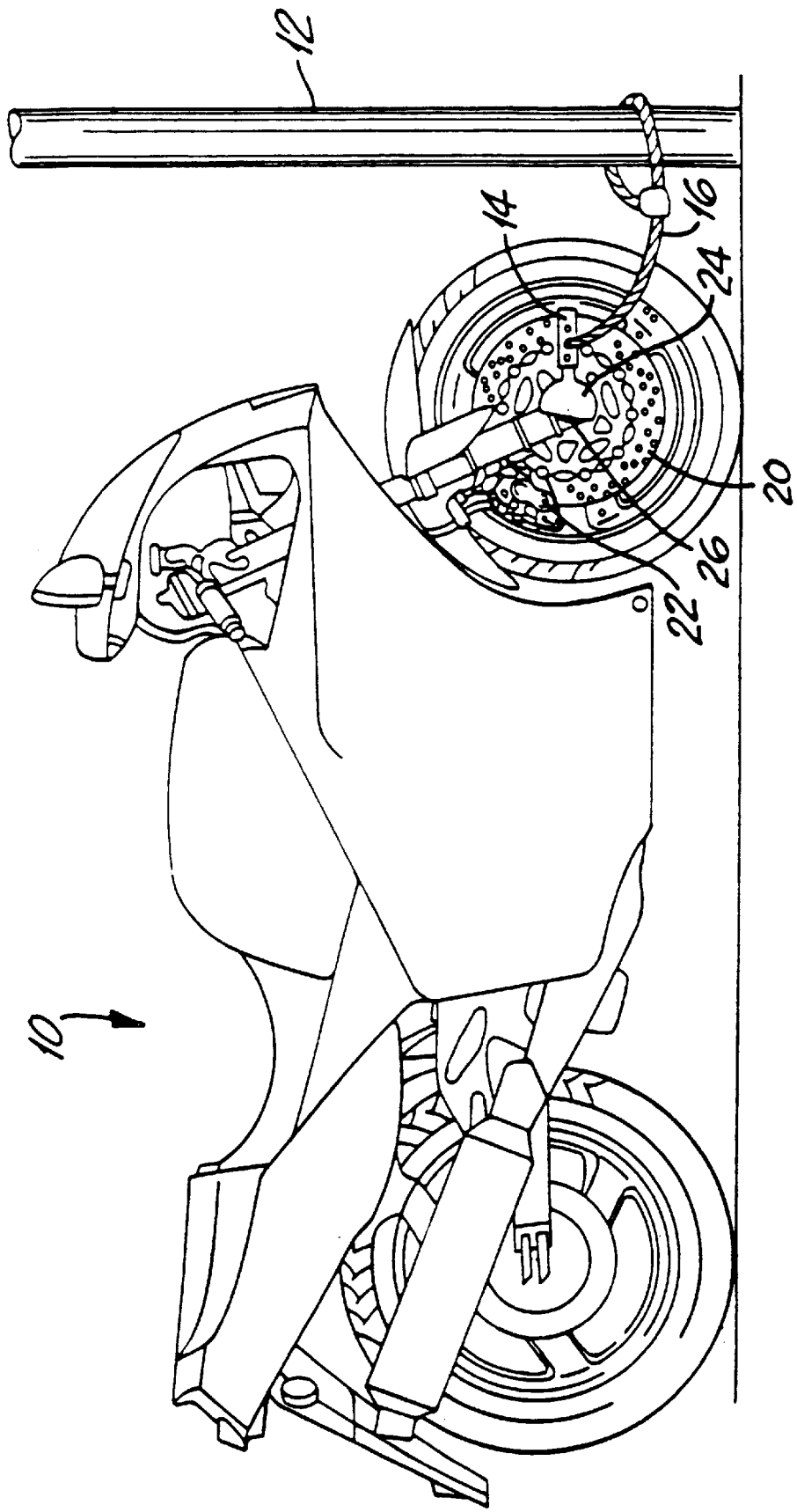
FIG. 1 is a side view of a motorcycle equipped with the lock of the present invention.

In FIG. 1 there is shown a motorcycle 10 which is secured to a stationary object, for example a lamp post 12, by means of a lock 14 and single loop cable 16 of the present invention. As can be seen in FIG. 1, and in more detail in FIG. 2, the brake rotor 20, which is provided on the front wheel of the motorcycle, is relatively thin and fits between the calipers 22 of the brake. When the brakes are applied, the calipers engage the rotor 20 to slow down and stop the motorcycle.

Figure 2:
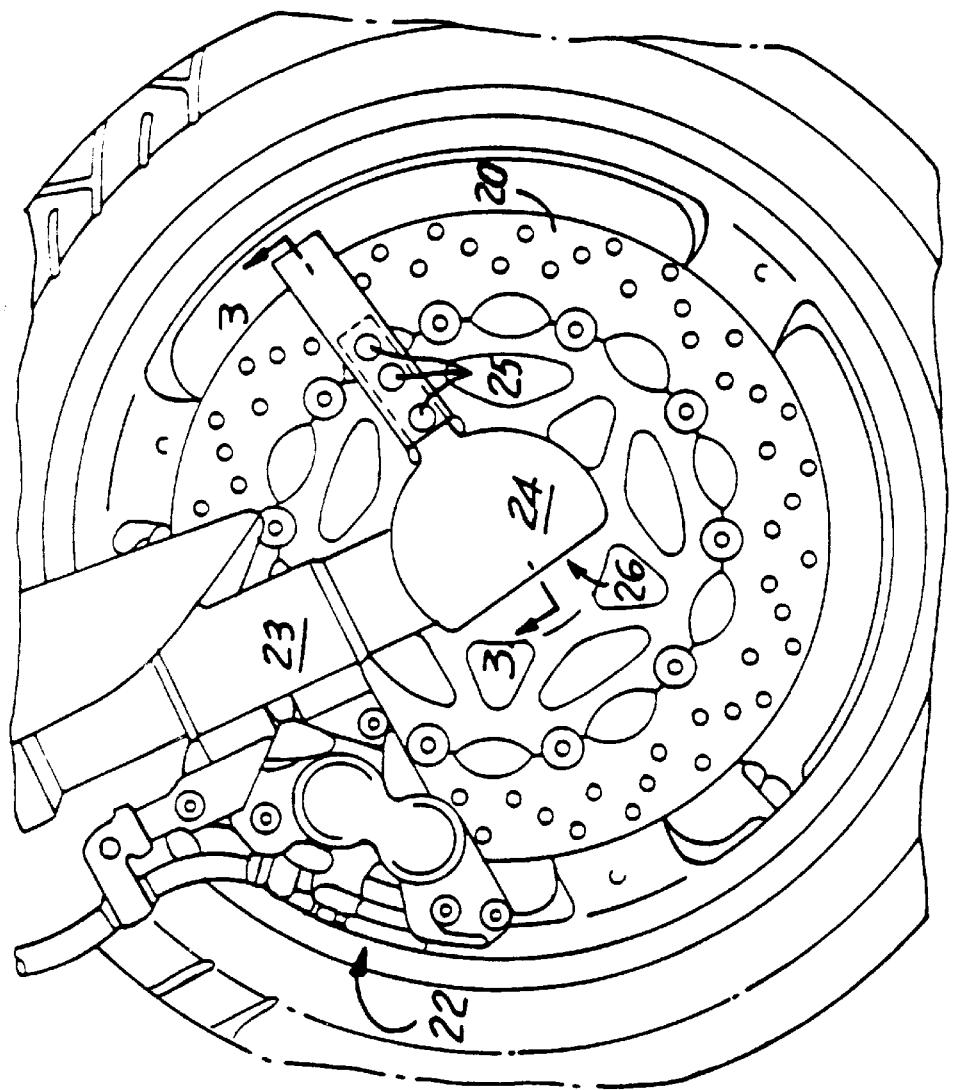
FIG. 2 is an enlarged view of the hub, brake rotor and lock of the present invention as illustrated in FIG. 1.

As can be seen from FIGS. 1 and 2, the lock 14 is clamped onto the rotor. It has a width, or thickness, such that it is impossible for the lock to pass beyond the calipers 22 or the fork 23 which holds the wheel on the frame. Therefore, the motorcycle front wheel can only turn a short distance in either direction before it is abruptly halted.

It can be seen that most of the motorcycle can be stolen if the front wheel is removed. In order to reduce the possibility of this, a shield 24 can be included in the lock 14. This shield as shown in FIG. 2 covers some of the bolts on the hub of the motorcycle, thus making it difficult to remove the front wheel. It should be noted that shield 24 as shown in FIG. 2 covers the bolts near the hub as well as the axle bolt of the hub. That is, the shield is outside the end of the fork 23, thus making it difficult to remove the front wheel.

In an alternative embodiment (FIG. 10), the shield 24 extends beneath the fork 23, but still covers some of the bolts on the wheel, making it difficult to remove the front wheel The distance from the hub 26 to a portion of the brake rotor will vary for different motorcycles. As a result, the shield is provided with a series of openings 25 so that the user can select the opening which fits with the locking bolt of the lock and still provides the maximum amount of coverage of the hub bolts.

Figure 3A:
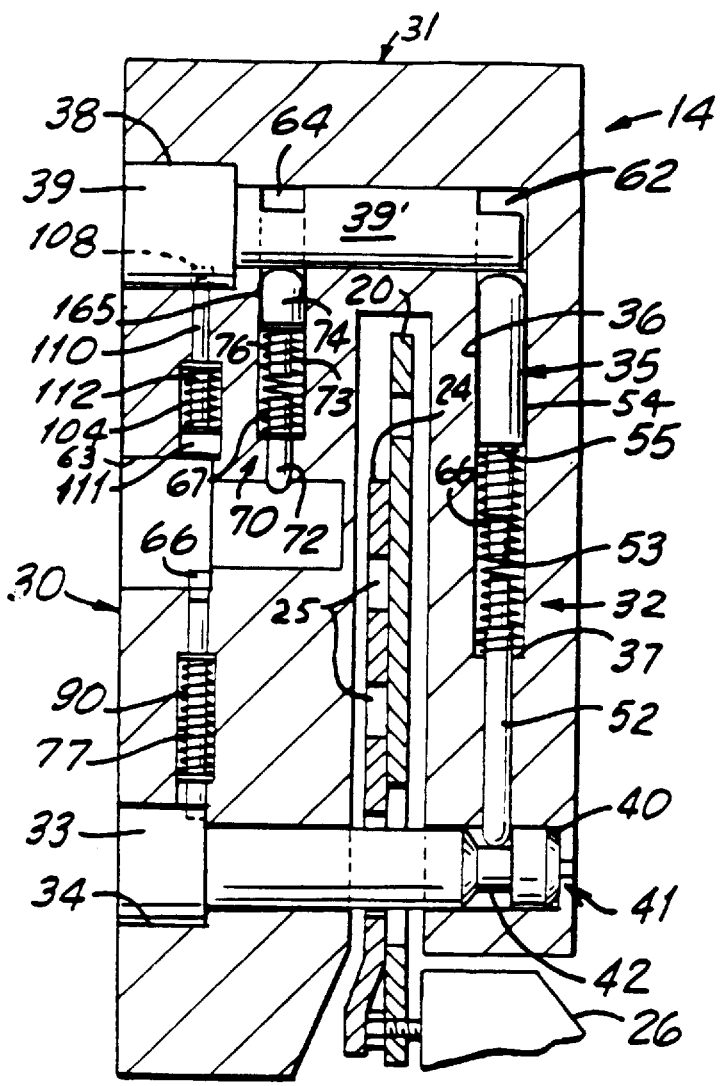
FIGS. 3A–C are front sectional views of locks of the present invention along line 3—3 in FIG. 2.

FIG. 3A provides a cross-sectional view of the lock along line 3—3 of FIG. 2. The lock 14 basically has an inverted U-shape, with leg portions 30, 32 connected by a base portion 31. Leg 32 is made shorter than leg 30 so that it avoids the hub 26. The separation between legs 30 and 32 is sufficiently wide to fit over the brake rotor 20 and shield 24. Also, the overall width of the lock 14 is wide enough to prevent it from fitting between the calipers 22 of the brake or the fork 23, thus preventing complete rotation of the front wheel of the motorcycle.

Figure 8:
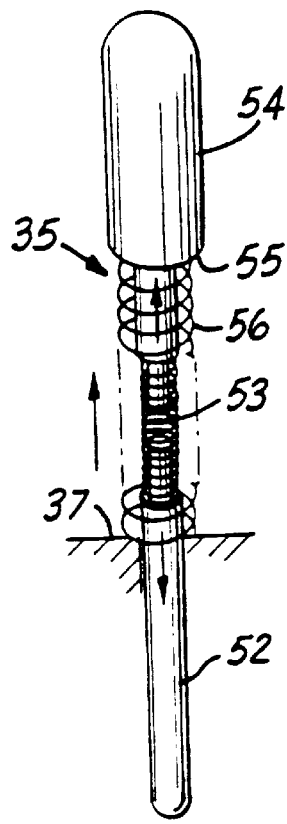
FIG. 8 is an exploded view of a double spring locking pin.

A locking bolt 33 is slidably positioned in a locking bolt channel 34 which extends through leg 30, and at least partially through leg 32, near the open end of the U-shaped lock 14. This locking bolt is positioned such that it can extend through one of the apertures near the interior edge of the brake rotor, whereby the lock 14 is retained on the rotor. The forward end of locking bolt 33 preferably has a tapered end 40. When the locking bolt 33 slides across the gap between legs 30 and 32, this tapered end 40 comes into engagement with a locking bolt pin 35. This locking pin has two cylindrical sections connected by a dual action springs. The lower section 52 is connected to the upper section 54 by means of an inner spring 53. This inner spring 53 tends to bias the sections 52, 54 away from each other. An exploded view of the locking bolt pin 35 is shown in FIG. 8.

Locking bolt pin 35 is contained in a locking bolt pin channel 36 which has a ledge 37 where it narrows towards its lower portion. The locking bolt pin 35 also has a ledge 55 towards its upper end where the upper part 54 is larger or wider. An outer spring 56 of the dual action locking bolt pin 35 extends between the ledge 37 of the channel and the ledge 55 on the upper part 54 of locking bolt pin 35. As a result, this outer spring tends to bias locking bolt pin 35 away from the bolt channel 34 in which locking bolt 33 slides.

At the upper end of locking bolt pin 35, there is a lock cylinder channel 38 which holds a lock cylinder 39 which has a lock cylinder cam 39' attached to its end. At the outer edge of cam 39', there is a cam surface 62 which engages the end of locking bolt pin 35. During the locking operation, when a lock key (not shown) operates lock cylinder 39, cam 39' is rotated so that its surface 62 pushes locking bolt pin 35 downwardly against the action of outer spring 56. As the tapered end 40 of locking bolt 33 comes into contact with the end of part 52 of locking bolt pin 35, inner spring 53 is compressed and part 52 rides up over the end of the locking bolt 33. Locking bolt 33 includes an annular recess 42. Thus, when the locking bolt 33 extends sufficiently into leg 32, part 52 snaps into recess 42 under the influence of inner spring 53. As long as cam surface 62 holds the locking bolt pin 35 in a downward position against the force of outer spring 56, inner spring 53 will cause part 52 to be retained in the recess 42.

When it is desired to release locking bolt 33 so that the lock 1A can be removed from the brake rotor, cam 39' is rotated by operation of the cylinder lock 39 using the lock key so that surface 62 allows spring 56 to cause the locking bolt pin 35 to retract from recess 42 in bolt 33. Then locking bolt 33 can be withdrawn axially (to the left in FIG. 3) so the open end of the lock 14 is clear so it can be removed from the brake rotor 20. Movement of locking bolt 33 can be by the manual application of pressure on the end of locking bolt 33 near surface 40, when the locking bolt 33 extends through leg 32, so as to cause the left end of locking bolt 33 to project from leg 30. If locking bolt 33 does not extend through leg 32, (as illustrated) a spring 41 at the end of channel 34 pushes locking bolt 33 partially out of channel 34 so it can be grasped and pulled the rest of the way out.

Figure 5:
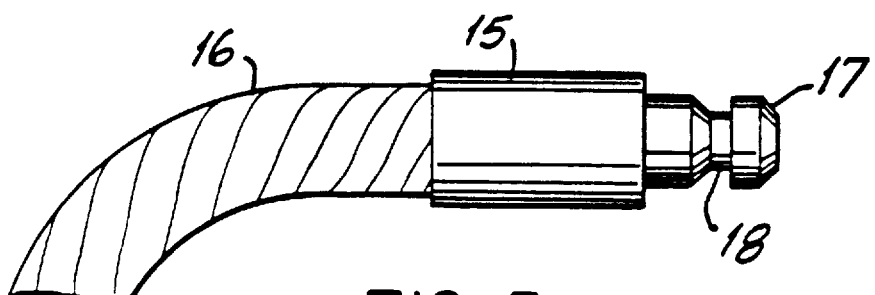
FIG. 5 illustrates the end of a locking cable according to the present invention.

If desired, a single loop cable 16 can be fastened to the lock 14. FIG. 5 shows the end 15 of this cable. Like the locking bolt 33, this end has tapered surfaces 17 and an annular recess 18. This end 15 is inserted into a lock-out channel 63 in leg 30 of the lock 14. A further channel 65 which contains a cable locking pin 70, intersects channel 63. Cable locking pin 70 is substantially the same shape as locking bolt pin 35. In particular, it has a lower narrow portion 72 connected to an upper portion 74 that has a ledge 75 where the upper portion becomes wider. These two parts 72, 74 are connected by two springs, i.e. an inner spring 73 that biases the parts away from each other and an outer spring 76 that extends from a ledge 67 where channel 65 narrows to the ledge 75 on cable locking pin 70. As a result of outer spring 76, the pin 70 is biased away from channel 63. However, there is a surface 64 on cam 39' which causes cable locking pin 70 to slide axially downward against the force of spring 76, so that the lower portion 72 extends into channel 63.

If the head 15 of cable 16 is inserted into channel 63, the tapered end 17 pushes against part 72 causing it to ride up over the edge of the head and compress spring 73. However, when it is fully inserted, part 72 projects downwardly into the annular channel 18 of head 15 under the influence of inner spring 73 and locks the head 15 into the body of lock 14.

Figure 3C:
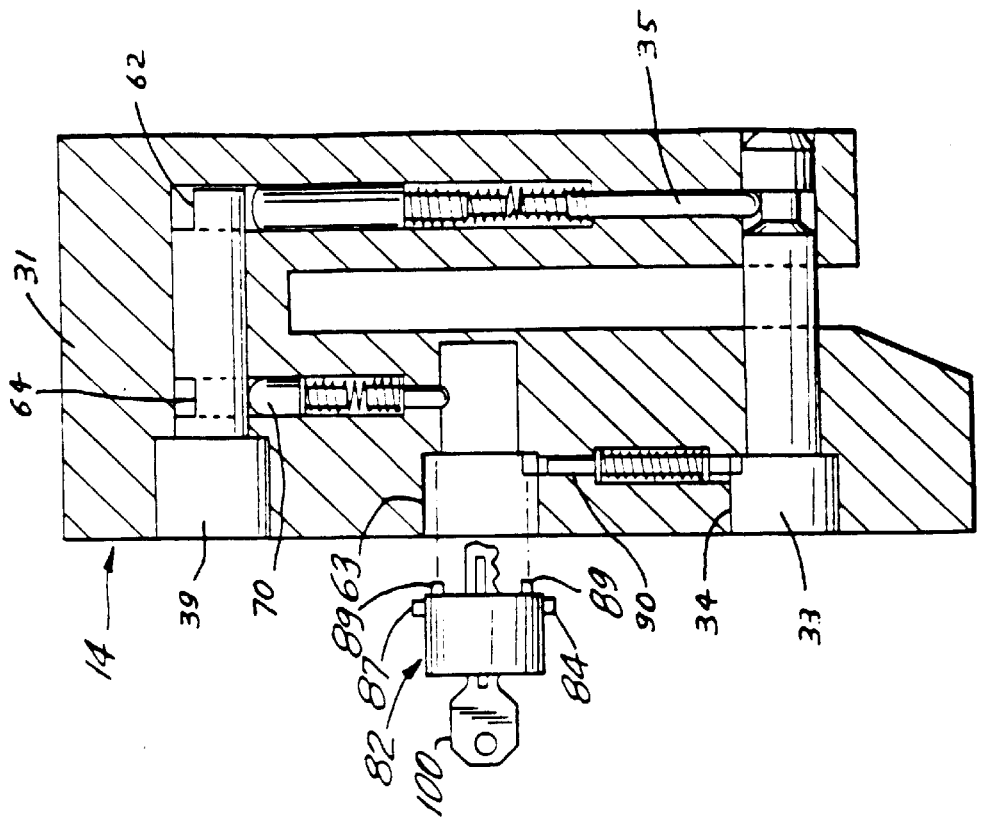
Figure 3B:
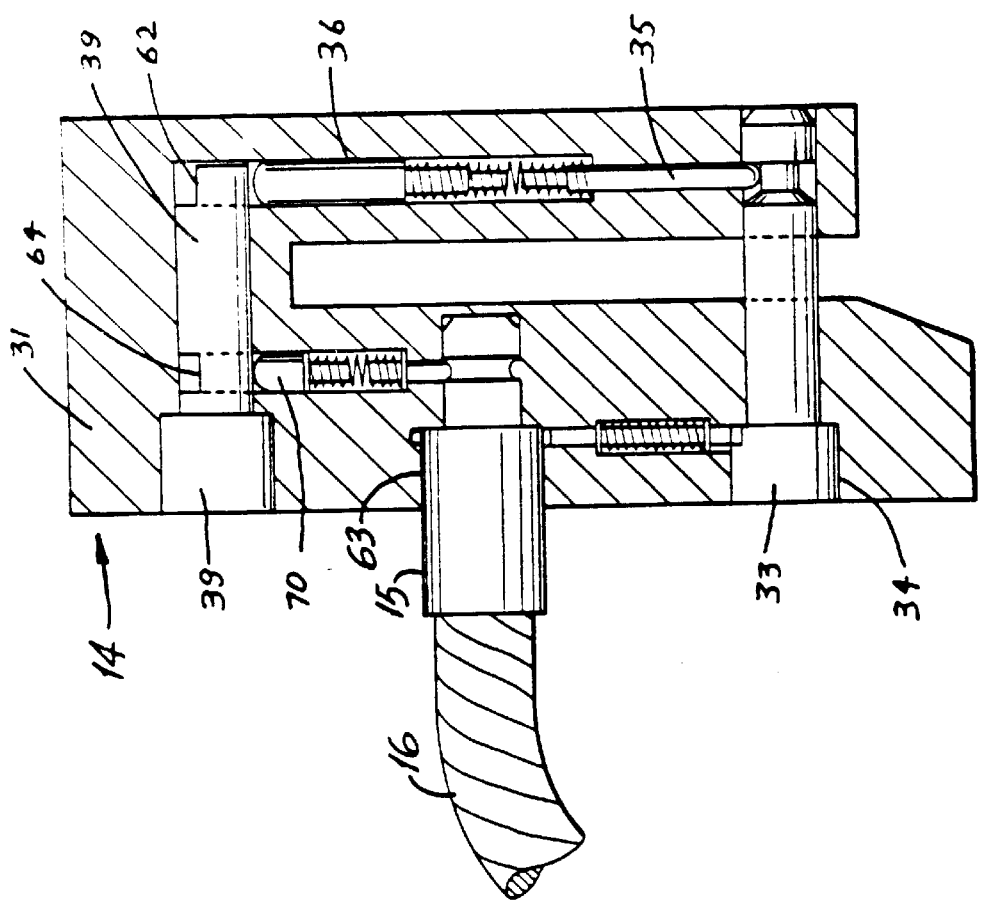

If cam 39' is rotated by the lock key operating the lock cylinder 39, it not only releases locking bolt pin 35 from locking bolt 33, it also releases cable locking pin 70 from the end of cable 16 (FIG. 3B).

As shown in FIGS. 2 and 3A, a shield 24 may be inserted into the gap between legs 30, 32 of the lock 14. This shield has multiple apertures 25, only one of which is retained on locking bolt 33 in the locking position. By selecting the particular aperture, the extension of the shield from the lock 14 towards the hub 26 can be adjusted for different size wheels and rotors.

The shield 24 extends down to the hub and covers two or more of the bolts which fastened the wheel and/or rotor to the hub. As a result of this shield, it is difficult to remove the front wheel and to defeat the locking mechanism of the present invention.

With the lock of the present invention, it could be very dangerous to the rider and damaging to the vehicle, if the user were to accidentally start the motorcycle and try to drive off. In the event this occurred, the motorcycle would move properly for a few feet until the lock 14 came into engagement with the brake calipers 22 or fork 23. At that point, rotation of the front wheel would be immediately stopped. Such a sudden stop of the vehicle could throw the rider over the handle bars, thus injuring the rider. Also, it is possible that engagement between the lock and the brake calipers could damage the brake calipers and/or the rotor. In order to prevent this from happening, a lock-out device 82 is included in the present invention.

Figure 7:
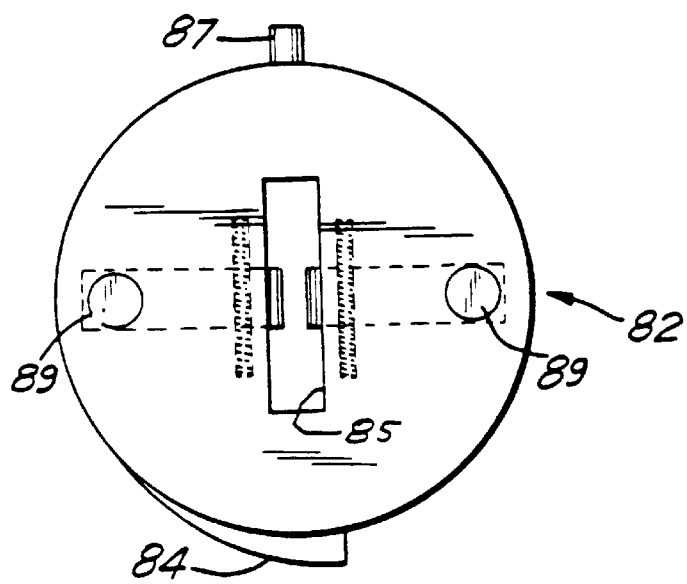
FIG. 7 is a front view of the lock-out device of FIG. 6.
Figure 6:
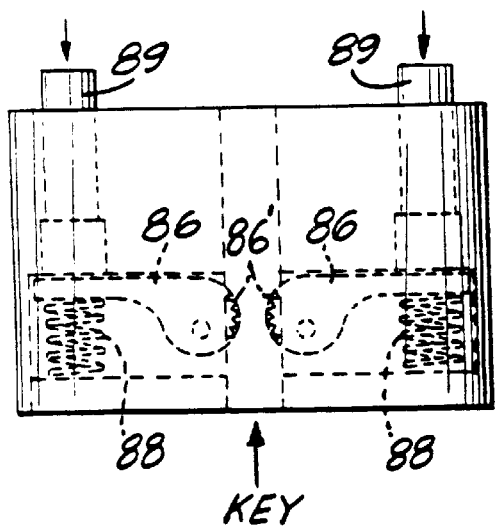
FIG. 6 is a top view (with parts omitted) of the lock-out device of the present invention.

The lock-out device 82 is intended to be inserted into the lock-out channel 63 as shown in FIG. 3C, and it has the shape shown in FIGS. 6 and 7. Before the lock 14 is put into use, the lock-out device 82 is retained in channel 63. In this position, the lock-out device presses on a pin 90 and causes it to extend into the lock-out channel 63 and block the end of the locking bolt 33 (FIG. 3). In this position, the locking bolt 33 cannot be slid across the open end of the lock and therefore the lock cannot be engaged. This is true because the lock-out device 82 has a cam 84 that presses on the end of pin 90. As the lock-out device 82 is rotated, the cam ceases to press on pin 90 and a spring 92 on pin 90 causes pin 90 to move away from channel 34 so that the pin 90 no longer blocks operation of locking bolt 33.

Figure 4:
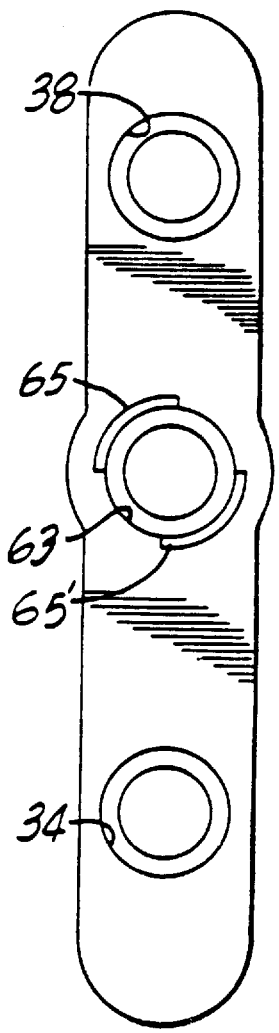
FIG. 4 is a side view of the lock of FIG. 3.
Figure 9:
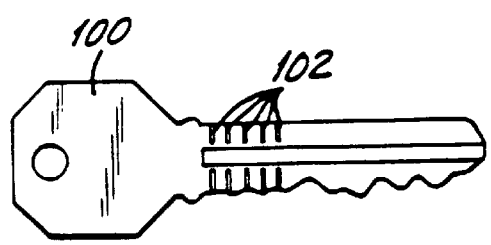
FIG. 9 illustrates lock-out ridges according to the present invention on a motorcycle ignition key.

Lock-out device 82 is adapted to be rotated by the ignition key, not the lock key. As shown in FIG. 9, the vehicle ignition key 100 is provided with a series of indentations 102 along its edges. Starting with the lock-out device 82 in the lock 14, when the key is inserted into key slot 85 and rotated, these ridges engage ratchet teeth 86' located on pivotal levers 86. As a result, these levers 86 are caused to rotate and compress springs 88. If an attempt is made to withdraw the key, the force of springs 88 acting on levers 86 prevents this from occurring. Therefore, when the lock-out device 82 is rotated to the proper position, so that cam 84 lines up with a slot 65 in channel 63, as best shown in FIG. 4, the lock-out device 86, with the ignition key 100 locked into it, can be withdrawn from channel 63. This allows pin 90 to withdraw from engagement with locking bolt 33.

On the side of the lock-out device 82, opposite from cam 84, there is a guide pin 87 (FIG. 7). In channel 63 there is another annular recess 65', which receives the pin 87 to assist the cam 84 in guiding rotation of the lock out device.

At this stage, i.e. when the lock out device 82 has been removed, the lock 14 can be installed on the brake rotor 20 as described above and the cable head 15 can be locked into lock-out channel 63. However, the ignition key 100 for the motorcycle is now retained in the lock-out device 82. Therefore, when the user approaches the bike to drive away and attempts to insert the key into the motorcycle ignition, the lock-out device 82 will prevent proper operation.

As an alternative, a further channel 104, shown in dotted-line in FIG. 3A, can extend from lock-out channel 63 to the lock cylinder channel 38 which holds cam 39'. In this channel 104 there is a pin 110, which is biased into an annular recess 108 in lock cylinder 39 or cam 39' via the cam surface 84 on lock-out device 82. As a result, cam 39' cannot be rotated so as to release pins 70 and 35 until the lock-out device 82 is removed using the ignition key 100. When it is removed, a spring 112 between a lower enlarged part 111 of pin 110 and a ledge 105 in the channel 104, biases pin 110 away from the recess 108 in lock cylinder 39 or cam 39'.

When the lock-out device 82 (with the ignition key 100 gripped therein) is returned to the lock-out channel 63, shafts 89 of the lock-out device, which project from its end (FIG. 6), come into contact with a shelf 66 in channel 63 (FIG. 3). These shafts 89 move axially into the lock-out device 82 and cause rotation of levers 86. Because the levers are eccentrically mounted, movement of these levers against the action of springs 86 causes them to move away from the key channel 85. As a result the ratchet teeth 86' no longer engage the grooves 102 in the ignition key 100 and the ignition key can be removed.

Figure 12:
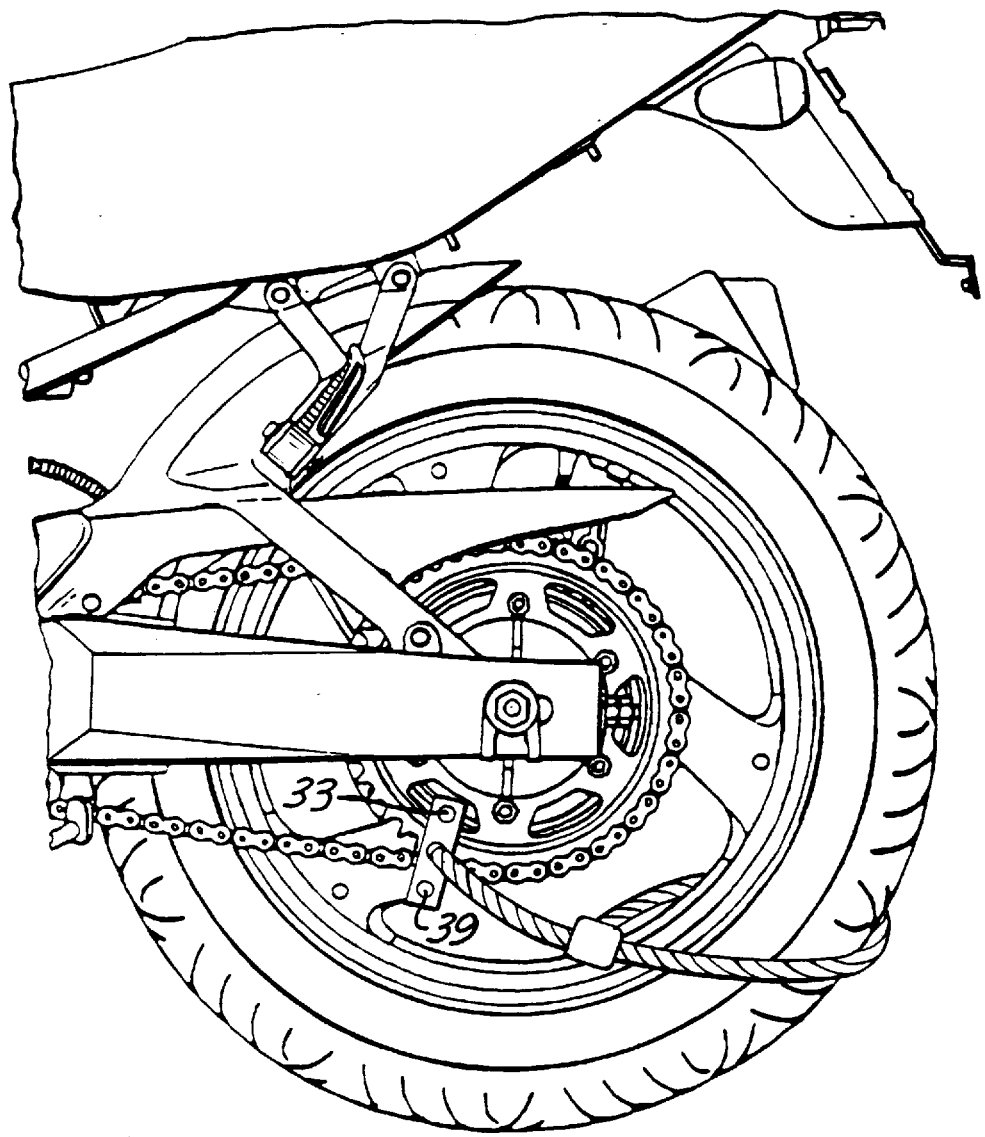
FIG. 12 is a side view of the rear of a motorcycle equipped with the lock of the present invention shown in FIG. 10.

It is difficult to take off the front wheel because of the brake calipers. However, as a further alternative, the gap between legs 30 and 32 can be made wider so that it fits over the rear sprocket and chain, as shown in FIGS. 10 and 11. In a rear wheel mount, the locking mechanism works in the same way as with the front wheel mount described above. Thus, the corresponding parts of the lock appearing in FIGS. 3B and 3C are similarly numbered in FIGS. 10 and 11. The embodiment of FIGS. 10 and 11 shows the wider gap between legs 30 and 32 required to accomodate mounting the lock over the chain and sprocket on the rear wheel, as shown in FIG. 12. As a result, the rear wheel will not be able to rotate because the rear sprocket will not be able to turn. In order to defeat the device in this position, you have to cut the chain. However, if the chain is cut, you have to disassemble the engine in order to insert a new one.

With a still further alternative, the cable 16 can be made long enough so that it can reach the front wheel from the back wheel and vice versa. Also, the lock-out device 82 may be incorporated into the head of the locking bolt 33, thereby eliminating the need for a separate aperture to house the lock-out device 82.

Figure 13:
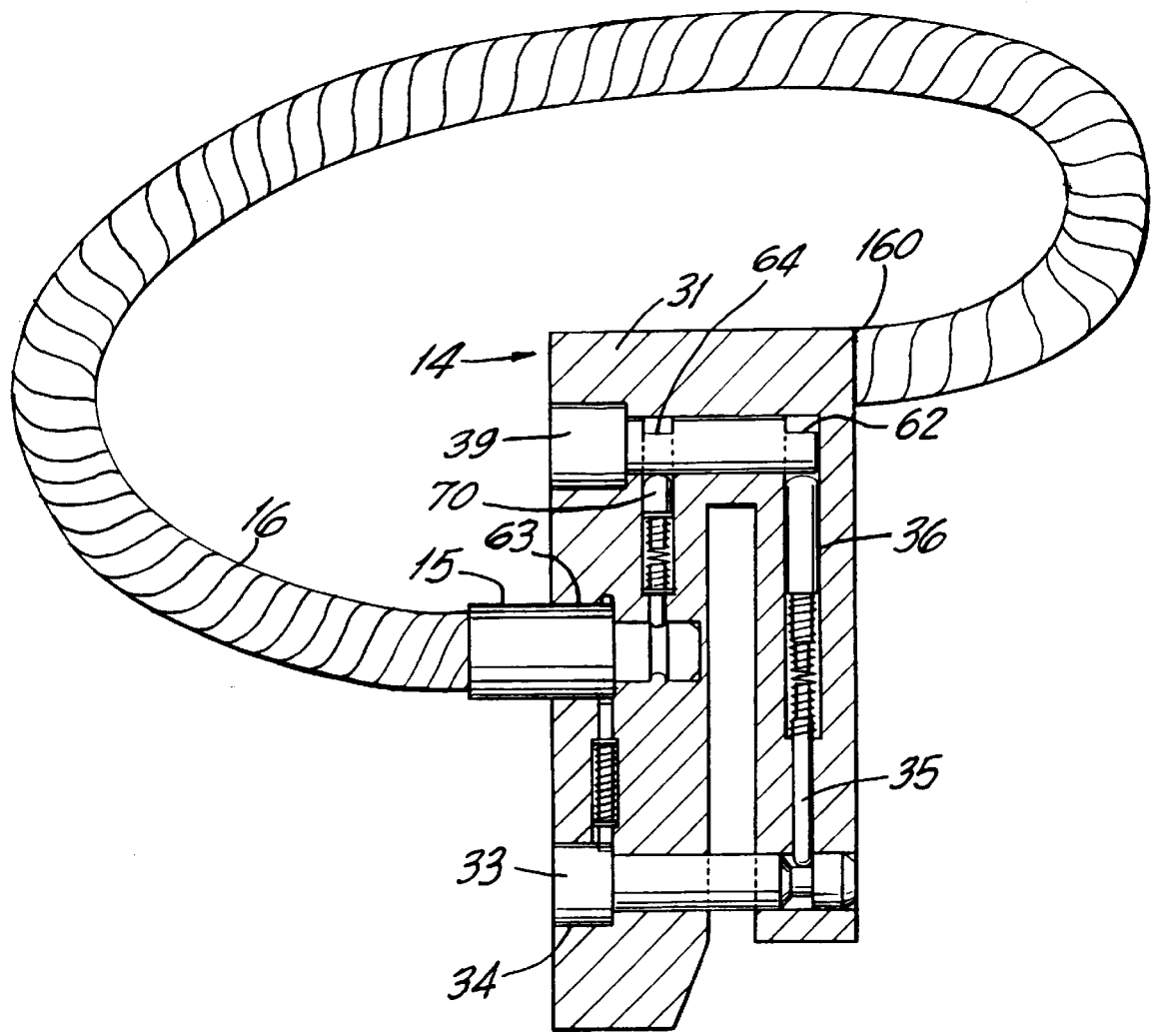
FIGS. 13 is a front sectional view of the lock of the present invention with an integrally formed cable.
Figure 14:
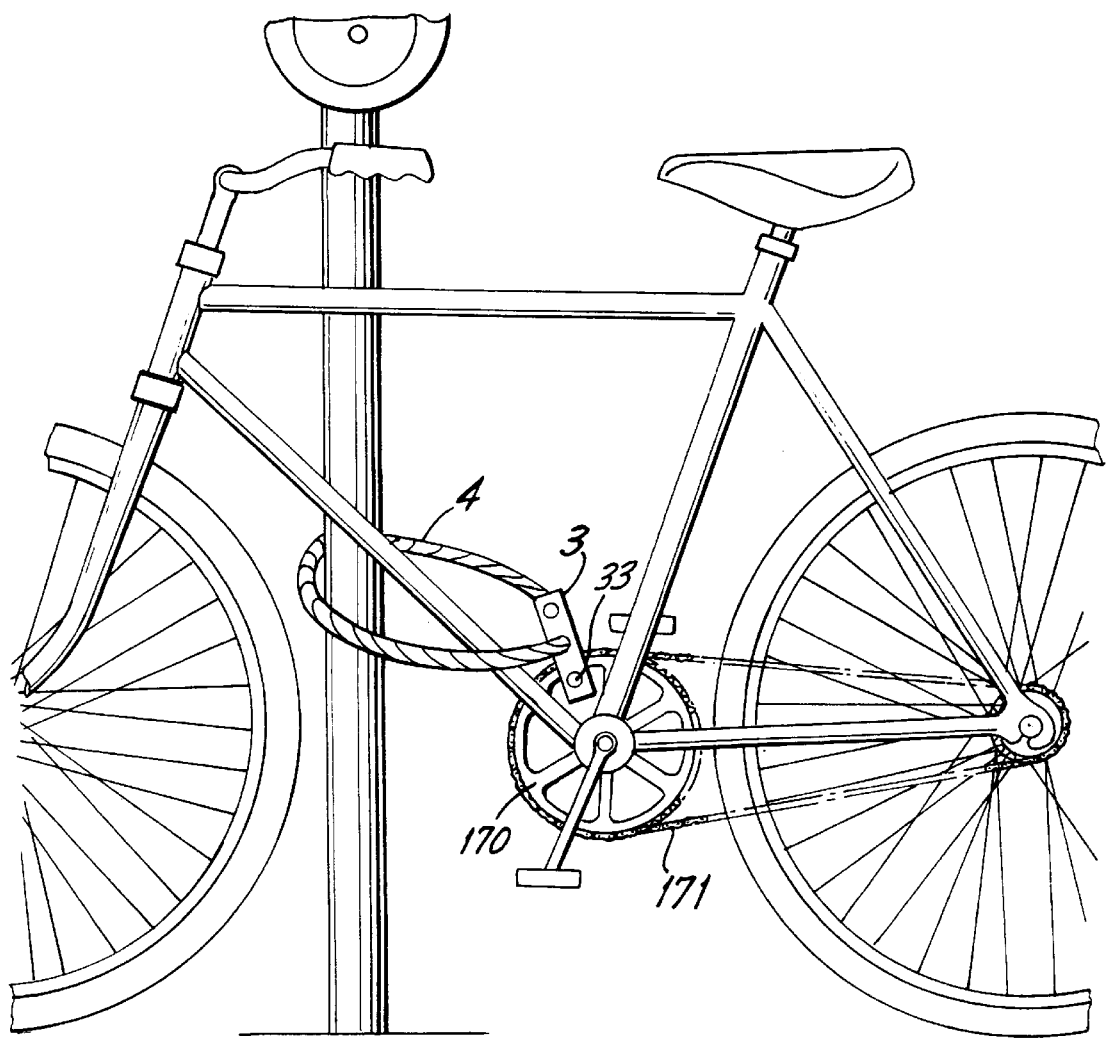
FIG. 14 is a side view of a bicycle having the lock of the present invention attached to its sprocket.

The lock of the present invention can also be used on other wheeled vehicles, such as a motor scooter or similar vehicle. It can also be adapted for use on an apertured drive sprocket of a bicycle, as shown in FIGS. 13 and 14. In FIG. 13, the lock-out device has been eliminated and the cable 16 is shown engaged. The cable 16 may additionally be permanently attached or formed with the main housing of the lock, such as by welding or similar means at, for example, location 160. The lock of FIG. 13 is shown in use in FIG. 14. In use the lock prevents rotation of the apertured sprocket 170, as it fits over the sprocket 170 and chain 171, and locking bolt 33 is secured through one the apertures of sprocket 170. The cable secures the bicycle to a stationary object.

While the invention has been particularly shown and described with reference to preferred embodiments thereof. It will be understood by those skilled in the art that various changes in form and detail may be made therein without departing from the true scope of the invention.

I claim:

1. A motorcycle lock to be fastened to an apertured rotatable element of a motorcycle in order to prevent the rotatable element from completing a full rotation as a result of contact of the lock with a stationary portion of said motorcycle, comprising:

a first leg member and a second leg member, a base member connected between one end of each said leg member to form a substantially U-shaped lock housing having a gap between said leg members, a portion of said rotatable element of said motorcycle being positionable in said gap;

a locking bolt channel extending at least partially through said first leg member and at least partially through said second leg member, a locking cylinder channel extending into said base member, and a locking bolt pin channel extending between said locking bolt channel and said locking cylinder channel;

a locking bolt member dimensioned for sliding in said locking bolt channel to extend from said first leg member across said gap through an aperture in said rotatable element and into said second leg member, said locking bolt member having a first recess;

a locking bolt pin slidably located in said locking bolt pin channel, said locking bolt pin being engagable in said first recess of said locking bolt member when said locking bolt member slides in said locking bolt channel into said second leg; and a cam member located in said locking cylinder channel, a first surface of said cam member engaging said locking bolt pin to urge said locking bolt pin into the first recess in said locking bolt member to hold said locking bolt member in position in said second leg member when said cam member is in a first position, and in a second position of said cam member allowing said locking bolt to withdraw from said first recess, whereby said lock is secured on the rotatable element and moves therewith until it engages a stationary portion of said motorcycle;

a lock-out channel formed in said first leg;

pin means disposed between said lock-out channel and said locking bolt channel for blocking full entry of said locking bolt member into said locking bolt channel in said second leg member; and a lock-out device removably insertable into said lock-out channel, said lock-out device in a first position engaging with said pin means and blocking full entry of said locking bolt member into said locking bolt channel in said second leg member so as to prevent engagement of said locking bolt member with said locking bolt pin, positioning of said lock-out device in said lock-out channel to a second position causing said pin means to unblock said locking bolt channel, said lock-out device being removable from said lock-out channel in said second position and being constrained in said lock-out channel in said first position of said lock-out device.

2. The motorcycle lock according to claim 1 wherein said lock-out device is rotatable in said lock-out channel.

3. A motorcycle lock to be fastened to an apertured rotatable element of a motorcycle in order to prevent the rotatable element from completing a full rotation as a result of contact of the lock with a stationary portion of said motorcycle, comprising:

a first leg member and a second leg member, a base member connected between one end of each said leg member to form a substantially U-shaped lock housing having a gap between said leg members, a portion of said rotatable element of said motorcycle being positionable in said gap;

a locking bolt channel extending at least partially through said first leg member and at least partially through said second leg member, a locking cylinder channel extending into said base member, and a locking bolt pin channel extending between said locking bolt channel and said locking cylinder channel;

a locking bolt member dimensioned for sliding in said locking bolt channel to extend from said first leg member across said gap through an aperture in said rotatable element and into said second leg member, said locking bolt member having a first recess;

a locking bolt pin slidably located in said locking bolt pin channel, said locking bolt pin being engagable in said first recess of said locking bolt member when said locking bolt member slides in said locking bolt channel into said second leg; and a cam member located in said locking cylinder channel, a first surface of said cam member engaging said locking bolt pin to urge said locking bolt pin into the first recess in said locking bolt member to hold said locking bolt member in position in said second leg member when said cam member is in a first position, and in a second position of said cam member allowing said locking bolt to withdraw from said first recess, whereby said lock is secured on the rotatable element and moves therewith until it engages a stationary portion of said motorcycle;

a dual function channel formed in said first leg;

pin means disposed between said dual function channel and said locking bolt channel for blocking full entry of said locking bolt member into said locking bolt channel in said second leg member; and a lock-out device removably insertable into said dual function channel, said lock-out device in a first position engaging with said pin means and blocking full entry of said locking bolt member into said locking bolt channel in said second leg member so as to prevent engagement of said locking bolt member with said locking bolt pin, positioning of said lock-out device in said dual function channel to a second position causing said pin means to unblock said locking bolt channel, said lock-out device being removable from said dual function channel in said second position and being constrained in said lock-out channel in said first position of said lock-out device.

4. The motorcycle lock according to claim 3 further comprising:
   a cable with a cable end that is insertable into said dual function channel;
   holding means in said lock housing for releasibly retaining said cable end in said dual function channel after insertion of said cable end therein, said lock-out device and said cable end being alternatively insertable in said dual function channel; and
   engagement means for locking and releasing said lock-out device in said respective positions of said lock-out device.

5. The motorcycle lock according to claims 3 or 4 wherein said lock-out device is rotatable in said dual function channel.

6. The motorcycle lock according to claims 1, 3 or 4 wherein said rotatable element is a sprocket of a rear wheel of the motorcycle for engaging a drive chain and wherein a portion of said sprocket is positionable in said gap.

7. A motorcycle lock to be fastened to an apertured rotatable element of a motorcycle in order to prevent the rotatable element from completing a full rotation as a result of contact of the lock with a stationary portion of said motorcycle, comprising:
   a first leg member and a second leg member, a base member connected between one end of each said leg member to form a substantially U-shaped lock housing having a gap between said leg members, a portion of said rotatable element of said motorcycle being positionable in said gap;
   a locking bolt channel extending at least partially through said first leg member and at least partially through said second leg member, a locking cylinder channel extending into said base member, and a locking bolt pin channel extending between said locking bolt channel and said locking cylinder channel;
   a locking bolt member dimensioned for sliding in said locking bolt channel to extend from said first leg member across said gap through an aperture in said rotatable element and into said second leg member, said locking bolt member having a first recess;
   a locking bolt pin slidably located in said locking bolt pin channel, said locking bolt pin being engagable in said first recess of said locking bolt member when said locking bolt member slides in said locking bolt channel into said second leg; and
   a cam member located in said locking cylinder channel, a first surface of said cam member engaging said locking bolt pin to urge said locking bolt pin into the first recess in said locking bolt member to hold said locking bolt member in position in said second leg member when said cam member is in a first position, and in a second position of said cam member allowing said locking bolt to withdraw from said first recess, whereby said lock is secured on the rotatable element and moves therewith until it engages a stationary portion of said motorcycle; and
   shielding means for covering at least part of a hub of the motorcycle and at least a portion of a fastening means of said hub, said shielding means being receivable in said gap and engageable with said locking bolt member.

8. A lock-out device for use with a motorcycle lock for preventing rotation of an apertured rotatable element of a motorcycle, comprising:
   a lock-out channel for selectively receiving said lock-out device, said channel being formed in a lock body having an open-ended slot formed between first and second spaced-apart leg members and dimensioned so as to receive a portion of said rotatable element;
   means for positioning said lock-out device for engaging a locking cylinder that engages a locking bolt between an open first position and a locked second position for selectively sealing off said slot, said lock-out device being positioned in a first lock-out position to block said locking bolt from fully sealing off said slot and a second lock-out position for disengaging said locking cylinder to permit said locking bolt to seal off said slot, said lock-out device being removable from said lock-out channel in said second lock-out position and being constrained in said lock-out channel in said first lock-out position.

9. A lock-out device for use with a motorcycle lock for preventing rotation of an apertured rotatable element of a wheeled vehicle, comprising:
   a lock-out channel for selectively receiving said lock-out device, said channel being formed in a lock body having an open-ended slot formed between first and second spaced-apart leg members and dimensioned so as to receive a portion of said rotatable element;
   means for positioning said lock-out device for engaging a locking cylinder that engages a locking bolt between an open first position and a locked second position for selectively sealing off said slot, said lock-out device being positioned in a first lock-out position to block said locking bolt from fully sealing off said slot and a second lock-out position for disengaging said locking cylinder to permit said locking bolt to seal off said slot, said lock-out device being removable from said lock-out channel in said second lock-out position and being constrained in said lock-out channel in said first lock-out position.

10. The lock-out device of claims 8 or 9 wherein said lock-out device includes key-receiving means for selectively receiving key means, said positioning of said lock-out device in said lock-out channel between said first and second lock-out positions being effected by rotation of said key means while in said key-receiving means.

11. The lock-out device of claim 10 wherein said key means is removable from said lock-out device in said first position of said lock-out device, said key means being constrained in said lock-out device in said second position of said lock-out device, and further comprising means in said lock-out device for locking said key means in said lock-out device in said second lock-out position.

12. A lock to be fastened to an apertured rotatable element of a wheeled vehicle to prevent the rotatable element from completing a full rotation, comprising:
   a first leg member and a second leg member, a base member connected between one end of each said leg member to form a U-shaped lock housing having a gap between said leg members, a portion of said rotatable element being positionable in said gap;
   a locking bolt channel extending at least partially through said first leg member and at least partially through said second leg member, a locking cylinder channel extending into said base member, and a locking bolt pin channel extending between said locking bolt channel and said locking cylinder channel;
   a locking bolt member dimensioned for sliding in said locking bolt channel to extend from said first leg member across said gap through an aperture in said rotatable element and into said second leg member, said locking bolt member having a first recess;

a locking bolt pin slidably located in said locking bolt pin channel, said locking bolt pin being engagable in said first recess of said locking bolt member when said locking bolt member slides in said locking bolt channel into said second leg;

a cam member located in said locking cylinder channel, a first surface of said cam member engaging said locking bolt pin to urge said locking bolt pin into the first recess in said locking bolt member to hold said locking bolt member in position in said second leg member when said cam member is in a first position, and in a second position of said cam member allowing said locking bolt to withdraw from said first recess, whereby said lock is secured on the rotatable element and moves therewith to prevent a full rotation of said rotatable element;

a lock-out channel formed in said first leg;

pin means disposed between said lock-out channel and said locking bolt channel for blocking full entry of said locking bolt member into said locking bolt channel in said second leg member; and a lock-out device removably insertable into said lockout channel, said lock-out device in a first position engaging with said pin means and blocking full entry of said locking bolt member into said locking bolt channel in said second leg member so as to prevent engagement of said locking bolt member with said locking bolt pin, positioning of said lock-out device in said lock-out channel to a second position causing said pin means to unblock said locking bolt channel, said lock-out device being removable from said lock-out channel in said second position and being constrained in said lock-out channel in said first position of said lock-out device.

13. The lock of claim 12 wherein the rotatable element is a sprocket.

14. A motorcycle lock to be fastened to an apertured rotatable element of a motorcycle in order to prevent the rotatable element from completing a full rotation as a result of contact of the lock with a stationary portion of said motorcycle, comprising:

a lock body with an open-ended gap formed between first and second spaced-apart leg members, a portion of said rotatable element of said motorcycle being positionable in said gap;

a locking bolt channel extending at least partially through said first leg member and at least partially through said second leg member, a locking cylinder channel positioned in said lock body, and a locking bolt pin channel extending between said locking bolt channel and said locking cylinder channel;

a locking bolt member dimensioned for sliding in said locking bolt channel to extend from said first leg member across said gap through an aperture in said rotatable element and into said second leg member, said locking bolt member having a first recess;

a locking bolt pin slidably located in said locking bolt pin channel, said locking bolt pin being engagable in said first recess of said locking bolt member when said locking bolt member slides in said locking bolt channel into said second leg; and a cam member located in said locking cylinder channel, a first surface of said cam member engaging said locking bolt pin to urge said locking bolt pin into the first recess in said locking bolt member to hold said locking bolt member in position in said second leg member when said cam member is in a first position, and in a second position of said cam member allowing said locking bolt to withdraw from said first recess, whereby said lock is secured on the rotatable element and moves therewith until it engages a stationary portion of said motorcycle;

a lock-out channel formed in said first leg member;

pin means disposed between said lock-out channel and said locking bolt channel for blocking full entry of said locking bolt member into said locking bolt channel in said second leg member; and a lock-out device removably insertable into said lock-out channel, said lock-out device in a first position engaging with said pin means and blocking full entry of said locking bolt member into said locking bolt channel in said second leg member so as to prevent engagement of said locking bolt member with said locking bolt pin, positioning of said lock-out device in said lock-out channel to a second position causing said pin means to unblock said locking bolt channel, said lock-out device being removable from said lock-out channel in said second position and being constrained in said lock-out channel in said first position of said lock-out device.

15. A motorcycle lock to be fastened to an apertured rotatable element of a motorcycle in order to prevent the rotatable element from completing a full rotation as a result of contact of the lock with a stationary portion of said motorcycle, comprising:

a lock body with an open-ended gap formed between first and second spaced-apart leg members, a portion of said rotatable element of said motorcycle being positionable in said gap;

a locking bolt channel extending at least partially through said first leg member and at least partially through said second leg member, a locking cylinder channel positioned in said lock body, and a locking bolt pin channel extending between said locking bolt channel and said locking cylinder channel;

a locking bolt member dimensioned for sliding in said locking bolt channel to extend from said first leg member across said gap through an aperture in said rotatable element and into said second leg member, said locking bolt member having a first recess;

a locking bolt pin slidably located in said locking bolt pin channel, said locking bolt pin being engagable in said first recess of said locking bolt member when said locking bolt member slides in said locking bolt channel into said second leg; and a cam member located in said locking cylinder channel, a first surface of said cam member engaging said locking bolt pin to urge said locking bolt pin into the first recess in said locking bolt member to hold said locking bolt member in position in said second leg member when said cam member is in a first position, and in a second position of said cam member allowing said locking bolt to withdraw from said first recess, whereby said lock is secured on the rotatable element and moves therewith until it engages a stationary portion of said motorcycle;

a dual function channel formed in said first leg member;

pin means disposed between said dual function channel and said locking bolt channel for blocking full entry of said locking bolt member into said locking bolt channel in said second leg member; and a lock-out device removably insertable into said dual function channel, said lock-out device in a first position engaging with said pin means and blocking full entry of said locking bolt member into said locking bolt channel in said second leg member so as to prevent engagement of said locking bolt member with said locking bolt pin, positioning of said lock-out device in said dual function channel to a second position causing said pin means to unblock said locking bolt channel, said lock-out device being removable from said dual function channel in said second position and being constrained in said lock-out channel in said first position of said lock-out device.

16. A lock-out device for use with a lock for preventing rotation of an apertured rotatable element of a wheeled vehicle, comprising:

a lock-out channel for selectively receiving said lock-out device, said channel being formed in a lock body having an opening dimensioned so as to receive a portion of said rotatable element;

means for positioning said lock-out device for engaging a locking cylinder that engages a locking bolt between an open first position and a locked second position for selectively sealing off said slot, said lock-out device being positioned in a first lock-out position to block said locking bolt from fully sealing off said slot and a second lock-out position for disengaging said locking cylinder to permit said locking bolt to seal off said slot, said lock-out device being removable from said lock-out channel in said second lock-out position and being constrained in said lock-out channel in said first lock-out position.

17. The lock-out device of claim 16 wherein said lock-out device includes key-receiving means for selectively receiving key means, said positioning of said lock-out device in said lock-out channel between said first and second lock-out positions being effected by rotation of said key means while in said key-receiving means.

18. The lock-out device of claim 17 wherein said key means is removable from said lock-out device in said first position of said lock-out device, said key means being constrained in said lock-out device in said second position of said lock-out device, and further comprising means in said lock-out device for locking said key means in said lock-out device in said second lock-out position.

19. The lock-out device of claims 11 or 18 wherein said key means includes an ignition or starting key.

20. In combination, a lock and an apertured rotatable element of a wheeled vehicle comprising:

an apertured rotatable element of a wheeled vehicle;

a lock body to be fastened to the apertured rotatable element to prevent the rotatable element from completing a full rotation; said lock body comprising a first leg member and a second leg member, a base member connected between one end of each said leg member to form a U-shaped lock housing having a gap between said leg members, a portion of said rotatable element being positionable in said gap;

a locking bolt channel extending at least partially through said first leg member and at least partially through said second leg member, a locking cylinder channel extending into said base member, and a locking bolt pin channel extending between said locking bolt channel and said locking cylinder channel;

a locking bolt member dimensioned for sliding in said locking bolt channel to extend from said first leg member across said gap through an aperture in said rotatable element and into said second leg member, said locking bolt member having a first recess;

a locking bolt pin slidably located in said locking bolt pin channel, said locking bolt pin being engagable in said first recess of said locking bolt member when said locking bolt member slides in said locking bolt channel into said second leg; and a cam member located in said locking cylinder channel, a first surface of said cam member engaging said locking bolt pin to urge said locking bolt pin into the first recess in said locking bolt member to hold said locking bolt member in position in said second leg member when said cam member is in a first position, and in a second position of said cam member allowing said locking bolt to withdraw from said first recess, whereby said lock is secured on the rotatable element and moves therewith to prevent a full rotation of said rotatable element.

21. In combination, a motorcycle lock and an apertured rotatable element of a motorcycle comprising:

an apertured rotatable element of a motorcycle;

a lock body to be fastened to the apertured rotatable element to prevent the rotatable element from completing a full rotation; said lock body comprising a gap formed between a first leg member and a second leg member, a portion of said rotatable element being positionable in said gap;

a locking bolt channel extending at least partially through said first leg member and at least partially through said second leg member, a locking cylinder channel extending into said base member, and a locking bolt pin channel extending between said locking bolt channel and said locking cylinder channel;

a locking bolt member dimensioned for sliding in said locking bolt channel to extend from said first leg member across said gap through an aperture in said rotatable element and into said second leg member, said locking bolt member having a first recess;

a locking bolt pin slidably located in said locking bolt pin channel, said locking bolt pin being engagable in said first recess of said locking bolt member when said locking bolt member slides in said locking bolt channel into said second leg; and a cam member located in said locking cylinder channel, a first surface of said cam member engaging said locking bolt pin to urge said locking bolt pin into the first recess in said locking bolt member to hold said locking bolt member in position in said second leg member when said cam member is in a first position, and in a second position of said cam member allowing said locking bolt to withdraw from said first recess, whereby said lock is secured on the rotatable element and moves therewith to prevent a full rotation of said rotatable element.

22. A method of locking a motorcycle by preventing rotation of an apertured rotatable element of the motorcycle comprising:

fastening to said rotatable element a lock comprising a lock body having a gap formed between a first leg member and a second leg member, a portion of said rotatable element being positionable in said gap;

a locking bolt channel extending at least partially through said first leg member and at least partially through said second leg member, a locking cylinder channel extending into said base member, and a locking bolt pin channel extending between said locking bolt channel and said locking cylinder channel;

a locking bolt member dimensioned for sliding in said locking bolt channel to extend from said first leg member across said gap through an aperture in said rotatable element and into said second leg member, said locking bolt member having a first recess;

a locking bolt pin slidably located in said locking bolt pin channel, said locking bolt pin being engagable in said first recess of said locking bolt member when said locking bolt member slides in said locking bolt channel into said second leg; and a cam member located in said locking cylinder channel, a first surface of said cam member engaging said locking bolt pin to urge said locking bolt pin into the first recess in said locking bolt member to hold said locking bolt member in position in said second leg member when said cam member is in a first position, and in a second position of said cam member allowing said locking bolt to withdraw from said first recess, whereby said lock is secured on the rotatable element and moves therewith to prevent a full rotation of said rotatable element.

23. A method of locking a wheeled vehicle by preventing rotation of an apertured rotatable element of the vehicle comprising:

fastening to said rotatable element a lock comprising a lock body having a gap formed between a first leg member and a second leg member, a portion of said rotatable element being positionable in said gap;

a locking bolt channel extending at least partially through said first leg member and at least partially through said second leg member, a locking cylinder channel extending into said base member, and a locking bolt pin channel extending between said locking bolt channel and said locking cylinder channel;

a locking bolt member dimensioned for sliding in said locking bolt channel to extend from said first leg member across said gap through an aperture in said rotatable element and into said second leg member, said locking bolt member having a first recess;

a locking bolt pin slidably located in said locking bolt pin channel, said locking bolt pin being engagable in said first recess of said locking bolt member when said locking bolt member slides in said locking bolt channel into said second leg; and a cam member located in said locking cylinder channel, a first surface of said cam member engaging said locking bolt pin to urge said locking bolt pin into the first recess in said locking bolt member to hold said locking bolt member in position in said second leg member when said cam member is in a first position, and in a second position of said cam member allowing said locking bolt to withdraw from said first recess, whereby said lock is secured on the rotatable element and moves therewith to prevent a full rotation of said rotatable element.

* * * * *